(12) United States Patent
Patel et al.

(10) Patent No.: US 7,290,064 B2
(45) Date of Patent: Oct. 30, 2007

(54) ADAPTIVE FEEDBACK TECHNIQUE IMPLEMENTED IN MOBILE IP NETWORKS

(75) Inventors: Alpesh Patel, Santa Clara, CA (US); Kent K. Leung, Mountain View, CA (US); Gaetan Feige, L'Hay-les-Roses (FR)

(73) Assignee: Cisco Technology, Inc., San Jose, CA (US)

( * ) Notice: Subject to any disclaimer, the term of this patent is extended or adjusted under 35 U.S.C. 154(b) by 696 days.

(21) Appl. No.: 10/180,640

(22) Filed: Jun. 24, 2002

(65) Prior Publication Data

US 2003/0236827 A1 Dec. 25, 2003

(51) Int. Cl.
G06F 15/16 (2006.01)

(52) U.S. Cl. ............... 709/250; 709/228; 709/230; 719/328

(58) Field of Classification Search ............ 709/233, 709/242, 250, 228, 230; 719/328
See application file for complete search history.

(56) References Cited

U.S. PATENT DOCUMENTS

| | | | |
|---|---|---|---|
| 6,359,901 B1 * | 3/2002 | Todd et al. ............ | 370/465 |
| 6,590,879 B1 * | 7/2003 | Huang et al. .......... | 370/331 |
| 6,606,482 B1 * | 8/2003 | Wheeler ............... | 455/11.1 |
| 6,680,930 B2 * | 1/2004 | Newberg et al. ........ | 370/348 |
| 6,687,226 B1 * | 2/2004 | Galyas ................. | 370/231 |
| 6,690,659 B1 * | 2/2004 | Ahmed et al. .......... | 370/328 |
| 6,735,176 B1 * | 5/2004 | So ..................... | 370/237 |
| 2003/0097484 A1 * | 5/2003 | Bahl ................... | 709/213 |
| 2004/0213181 A1 * | 10/2004 | Grech et al. ........... | 370/331 |
| 2005/0021804 A1 * | 1/2005 | Hameleers et al. ...... | 709/231 |

FOREIGN PATENT DOCUMENTS

| | | |
|---|---|---|
| EP | 1189405 A1 | 3/2002 |
| WO | 00/76139 | 12/2000 |
| WO | 02/10943 A1 | 2/2002 |
| WO | WO 02/10943 | 2/2002 |
| WO | 02/080452 A2 | 10/2002 |

OTHER PUBLICATIONS

W.Richards Stevens; TCP/IP Illustrated vol. 1 The Protocols; Addison Wesley, 1994; pp. 1-7.*

(Continued)

*Primary Examiner*—David Wiley
*Assistant Examiner*—Asghar Bilgrami
(74) *Attorney, Agent, or Firm*—Beyer Weaver LLP

(57) ABSTRACT

An adaptive feedback technique is described for a Mobile IP environment in which Mobile IP mechanisms provide early feedback to mechanisms in the transport layer and/or application layer of a mobile node in response to detection of changes in link characteristics of the communication used by the mobile node to communicate with a data network. Using the early feedback information, appropriate measures may then be taken in order to accommodate the changes in link characteristics. Such appropriate measures may include, for example, providing feedback to media aware applications in order to allow such applications to dynamically adjust their bandwidth requirements to accommodate the new link characteristics, modifying timeout parameters, modifying an encoding formats to accommodate the new link characteristics, notifying participants in a real-time application session of the detected changes in the link characteristics, etc.

71 Claims, 9 Drawing Sheets

OTHER PUBLICATIONS

Guerri, et al., "A feedback packet-level error control for real-time applications in wireless networks", Vehicular Technology Conference, 1999, VTC 1999—Fall. IEEE VTS 50th Amsterdam, Netherlands Sep. 19-22, 1999, Piscataway, NJ, USA, IEEE, US, Sep. 19, 1999, pp. 879-883, XP010353105.

Schultzine, H., "RTP: A transport protocol for real-time applications", Network Working Group Request for Comments, XX, XX, Jan. 1, 1996, XP002204956.

International Search Report, Application No. PCU/US03/19862, Mailed Oct. 10, 2003; 7 pages.

Communication under Rule 112 EPC; Oct. 18, 2005; Partial International Search Report: 03 739 288.3—1525.

Guerri, J.C. et al.; "A Feedback Packet-Level Error Control for Real-Time Applications in Wireless Networks"; Vehicular Technology Conference, 1999. VTC 1999, Fall. IEEE VTS 50th Amsterdam, Netherlands; Sep. 19-22, 1999, Piscataway, NJ, USA, IEEE, US Sep. 19, 1999, pp. 879-883, XP010353105 ISBN: 0-7803-5435-4.

Postel, J.; "Internet Control Message Protocol"; (Online) Sep. 1981, XP002238199; Retrieved from the Internet: URL:ftp://ftp.isi.edu/in-notes/rfc792.txt (retrieved on Apr. 14, 2003 pp. 1-3, pp. 10, 11.

European Search Report; Apr. 26, 2006.

* cited by examiner

ADAPTIVE FEEDBACK TECHNIQUE IMPLEMENTED IN MOBILE IP NETWORKS

BACKGROUND OF THE INVENTION

The present invention is related generally to data networks, and more specifically to an adaptive feedback technique implemented in Mobile IP networks.

Mobile IP (herein referred to as "MIP") is a protocol which allows laptop computers or other mobile computer units (referred to as "Mobile Nodes" herein) to roam between various sub-networks at various locations—while maintaining internet and/or WAN connectivity. Without Mobile IP or related protocols, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3220 of the IP Routing for Wireless/Mobile Hosts Working Group, C. Perkins, Ed., January, 2002. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent (FA) (e.g. Foreign Agent 10a). Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted HA). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

As specified in RFC 3220, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

Now, suppose that Mobile Node 6 is removed from its home base network segment 12 and roams to a remote network segment (e.g., network segment 14a). Network segment 14a may include various other nodes such as a PC 16. The nodes on network segment 14a communicate with the internet through a router which doubles as Foreign Agent 10a. Typically, a Mobile IP network may include many different network segments (e.g., 14b,14c), with each network segment having a respective Foreign Agent (e.g., 10b,10c). A variety of different link types (e.g., GPRS, CDMA, wireless LAN, fixed Ethernet, CDPD, etc.) may be used to communicate with the different Foreign Agents in the Mobile IP network. For example, communication with Foreign Agent 10a may be achieved using a CDMA link, communication with Foreign Agent 10b may be achieved using a wireless LAN link, and communication with Foreign Agent 10c may be achieved using a CDPD link. Each type of communication link has different associated link characteristics, including different bandwidth characteristics. For example, the bandwidth of a GPRS link type may be about 144 Kbps, the bandwidth of a fixed Ethernet link type may be about 100 Mbps, and the bandwidth of a CDPD link type may be about 9.6 Kbps.

In the example of FIG. 1, Mobile Node 6 may identify Foreign Agent 10a through various agent solicitations and agent advertisements which form part of the Mobile IP protocol. When Mobile Node 6 engages with network segment 14a, it composes a registration request for the Home Agent 8 to bind the Mobile Node's current location with its home location. Foreign Agent 10a then relays the registration request to Home Agent 8 (as indicated by the dotted line "Registration"). During the registration process, the Home Agent and the Mobile Node 6 may then negotiate the conditions of the Mobile Node's attachment to Foreign Agent 10a. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10a updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14a).

Now, suppose that Mobile Node 6 wishes to send a message to a Correspondent Node 18 from its new location. An output message from the Mobile Node is then packetized and forwarded through Foreign Agent 10a over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10a. Foreign Agent 10a then strips the encapsulation and forwards the message to Mobile Node 6 on sub-network 14a. The packet forwarding mechanism implemented by the Home and Foreign Agents is often referred to as "tunneling."

It will be appreciated that Mobile IP (as described, for example, in RFC 3220, herein incorporated by reference in its entirety for all purposes) solves a network layer mobility problem by maintaining the same home address even when the mobile node (MN) traverses subnets within one network domain, moves across different domains, and/or moves across different network types (e.g. fixed Ethernet, WLAN, CDMA 2000, GPRS, etc.). Thus, Mobile IP provides application layer/session continuity since the IP address of the mobile mode does not change as the mobile node roams to different network segments or subnetworks.

However, one problem with conventional Mobile IP protocols is that applications running on top of Mobile IP are typically unaware of changes in underlying network layer or link layer characteristics until long after the conventional transport layer feedback mechanisms kick in. For example, referring to FIG. 1, if mobile node 6 were running a streaming video application (which generates bulk data) while the mobile node roamed from a fixed Ethernet link (which provides relatively high bandwidth) to a GPRS link (which provides relatively low bandwidth), the streaming video application may end up transmitting more data to the link layer of the GPRS link than that link is able to support. This, in turn, may cause network degradation until conventional transport layer feedback mechanisms kick in to help mitigate the network degradation issues.

Generally, most applications running at a mobile node are not designed to adapt to changes in network layer and/or link layer characteristics since the conventional transport layer feedback mechanisms typically hide such details from the applications. For example, conventional TCP protocols are able to handle congestion issues within the network by providing end-to-end flow control using a window mechanism. However, applications running on top of the TCP protocol are typically unaware of the window mechanism or other mechanisms used to handle network congestion at the transport layer. Moreover, the conventional feedback mechanisms at the transport layer typically do not kick in until after an amount of time has elapsed in which there exists degradation of network performance.

Accordingly, it will be appreciated that there exists a continual desire to improve upon Mobile IP technology in order to improve, for example, network performance and data integrity.

SUMMARY OF THE INVENTION

According to different embodiments of the present invention, various methods, devices, and computer program products are described for providing adaptive feedback in a mobile data network. The mobile data network includes plurality of mobile nodes which communicate with a data network via a plurality of network segments. Each network segment includes a communication link having associated link characteristics. As a mobile node moves through the Mobile IP network, the characteristics of the communication links which the mobile node uses to communicate with the data network may change as a result of the mobile node roaming to a new network segment. A change in at least one link characteristic (associated with the communication link used by the mobile node to communicate with the data network) is detected at the mobile node. According to one embodiment, the change in link characteristics may be detected by a Mobile IP layer of the mobile node. Applications or other software entities at the application layer of the mobile node may then be notified of information relating to the change in the at least one link characteristic to thereby enable the applications to adapt to the change in the at least one link characteristic.

According to one embodiment, the change in at least one link characteristic may include a change in link bandwidth. In such an embodiment, applications, protocols, and/or other mechanisms implemented at the transport layer and/or application layer will be notified of the change in link bandwidth in order to allow such applications, protocols, and/or mechanisms to dynamically adapt to the change in link bandwidth. For example, according to one implementation, an RTP/RTCP layer at the mobile node may be notified of information relating to the change in the at least one link characteristic to thereby enable the RTP/RTCP layer to dynamically adapt to the change in the at least one link characteristic. Such adaptations may include, for example, dynamically modifying a session bandwidth parameter associated with an RTCP portion of the RTP/RTCP layer, dynamically modifying an RTP message encoding format to accommodate the change in the at least one link characteristic, notifying other participants in a real-time application session of the change in the at least one link characteristic, etc.

According to a different embodiment, a spoofed source quench message may be generated at the mobile node in response to detecting a change in at least one link characteristic. In one implementation, the spoofed source quench message is compatible with an ICMP protocol. Further, according to one implementation, a source address of the spoofed source quench message may correspond to a network address of a corresponding node in the mobile data network which is engaged in a communication session with the mobile node, and a destination address of the spoofed source quench may message correspond to a home or network address of the mobile node.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Various aspects of the present invention describe an adaptive and/or proactive feedback technique in a Mobile IP environment in which Mobile IP (also referred to as the Mobile IP layer) provides early feedback to mechanisms in the transport layer and/or application layer in response to detecting changes in link characteristics (e.g., changes in link type, changes in link bandwidth, etc.) at a mobile node. Using the early feedback information, appropriate measures may then be taken in order to accommodate the changes in link characteristics. Such appropriate measures may include, for example, providing feedback to media aware applications in order to allow such applications to dynamically adjust their bandwidth requirements to accommodate the new link characteristics, modifying timeout parameters, modifying an encoding formats to accommodate the new link characteristics, notifying participants in a real-time application session of the detected changes in the link characteristics, etc. Moreover, because Mobile IP is able to detect changes in link characteristics due to mobile node movement, proactive measures may be taken to mitigate the effect of the link characteristic changes to thereby provide improved network performance in a time frame which is significantly faster than conventional transport layer feedback mechanisms.

Figure 1:
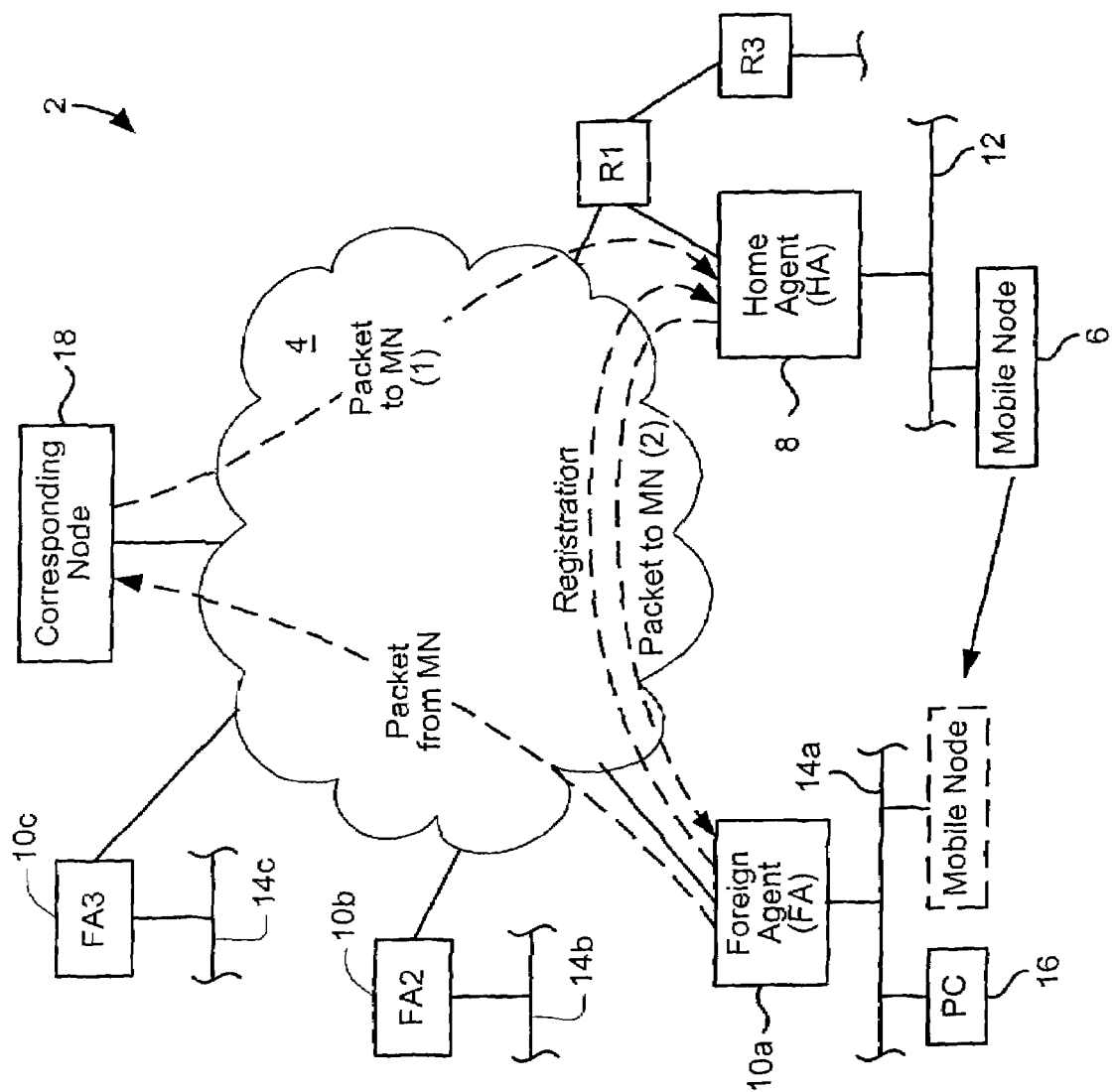
FIG. 1 is a diagram of a Mobile IP network segment and associated environment.
Figure 2:
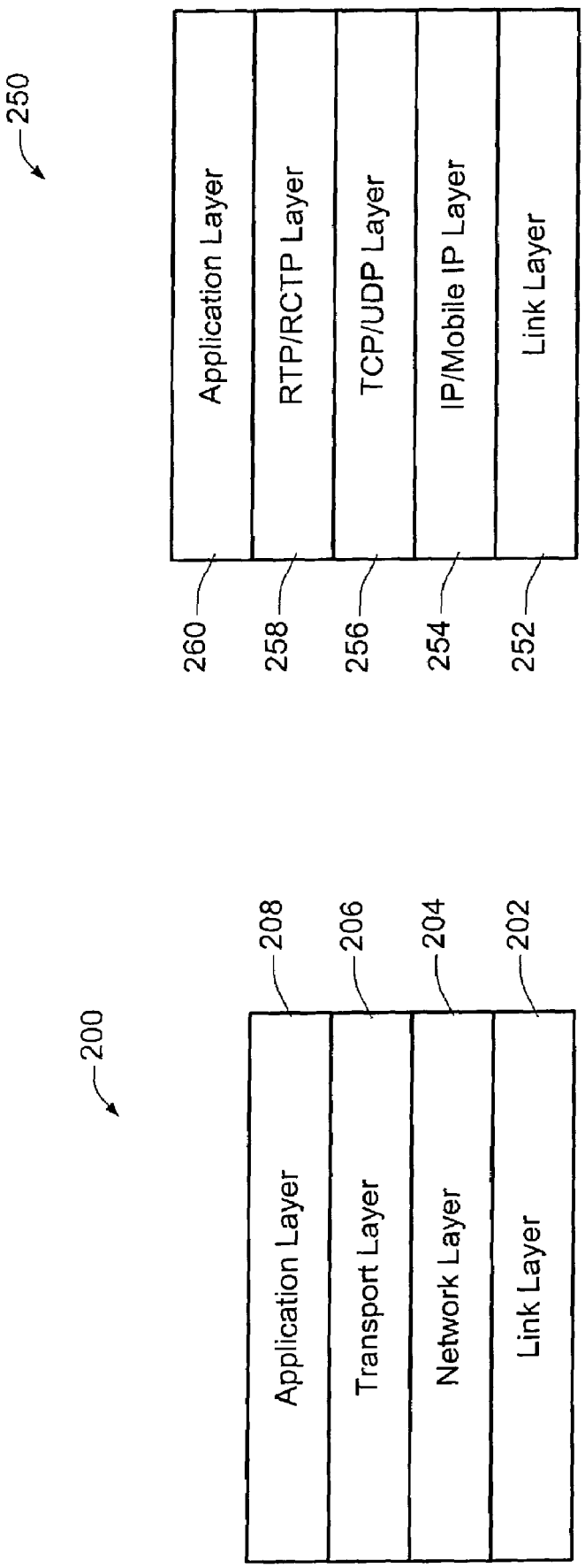
FIGS. 2A and 2B illustrate various layers which may exist in a Mobile IP node such as mobile node 6 of FIG. 1.

FIGS. 2A and 2B illustrate various layers which may exist at a mobile node such as mobile node 6 of FIG. 1. According to at least one embodiment, data communication to/from mobile node 6 may be accomplished via a plurality of layers as shown, for example, in FIG. 2A. The plurality of layers may include a link layer 202, and network layer 204, a transport layer 206, an application layer 208, etc. The purpose and function of each of the layers illustrated in FIG. 2A will generally be known to one having ordinary skill in the art.

According to specific embodiments of the present invention, Mobile IP functionality in the network layer 204 may be used to detect changes in link characteristics (e.g. link type, bandwidth, etc.) attributable, for example, to the mobile node moving through the Mobile IP network. In one embodiment, Mobile IP responds to changes detected in the link characteristics by directly notifying applications at the application layer 208 in order to cause the applications to dynamically adapt to the new link characteristics. In an alternate embodiment, Mobile IP may respond to a change detected in the link characteristics by notifying the transport layer 206 of changes in the link characteristics. The transport layer 206 may then cause applications in the application layer 208 to dynamically adapt to the new link characteristics. Such adaptations may include increasing or decreasing the data rates associated with one or more applications, changing encoding formats for transmitting and/or receiving data, etc.

FIG. 2B shows a specific embodiment of various layers which may be used for effecting communication at the mobile node 6 of FIG. 1. As illustrated in the embodiment of FIG. 2B, the mobile node may include a plurality of sub-layers or protocols such as, for example, a link layer 252; a IP/Mobile IP layer 254 which resides at the network layer 204; a TCP layer and/or UDP layer 256 which may reside at the transport layer 206; an RTCP/RTP layer 258, portions of which may reside at the transport layer 206 and/or the application layer 208; and application layer 260. According to one implementation, the application layer 260 may include one or more applications which are configured to run at the mobile node.

According to various embodiments, a number of different mechanisms may be used to provide early feedback to the transport layer and/or application layer (e.g., either independently or simultaneously) in response a change in one or more link characteristic being detected at the Mobile IP layer. At least some of these mechanisms are described in greater detail below.

A first mechanism which may be used to implement the adaptive feedback technique of the present invention is to generate a spoofed ICMP source quench message at a mobile node which undergoes a link change from high bandwidth link type to low bandwidth link type. As commonly known to one having ordinary skill in the art, ICMP stands for Internet Control Message Protocol, which is described in RFC 792,herein incorporated by reference in its entirety for all purposes. According to the Internet Control Message Protocol, an ICMP source quench message represents a request to a host or source device to cutback the rate at which it is sending traffic to the Internet destination. For example, if a source device is sending datagrams to a destination device at a rate which causes at least some of the datagrams to be dropped at the destination device (e.g., because the datagrams arrive too fast to be processed), the destination device may respond by sending an ICMP source quench message to the source device. On receipt of a source quench message, the source device will cut back the rate at which it is sending traffic to the destination device until it no longer receives source quench messages. The source device may then gradually increase the rate at which it sends traffic to the destination device until it again receives source quench messages.

Utilizing the ICMP source quench mechanism defined in RFC 792,a mobile node implemented in accordance with specific embodiment of the present invention may be configured or designed to generate a spoofed ICMP source quench message which is used locally at the various layers of the mobile node to thereby cause applications at the local mobile node to reduce the rate at which the applications are sending traffic over the communication link. An example of this technique is illustrated in FIG. 3 of the drawings.

Figure 3:
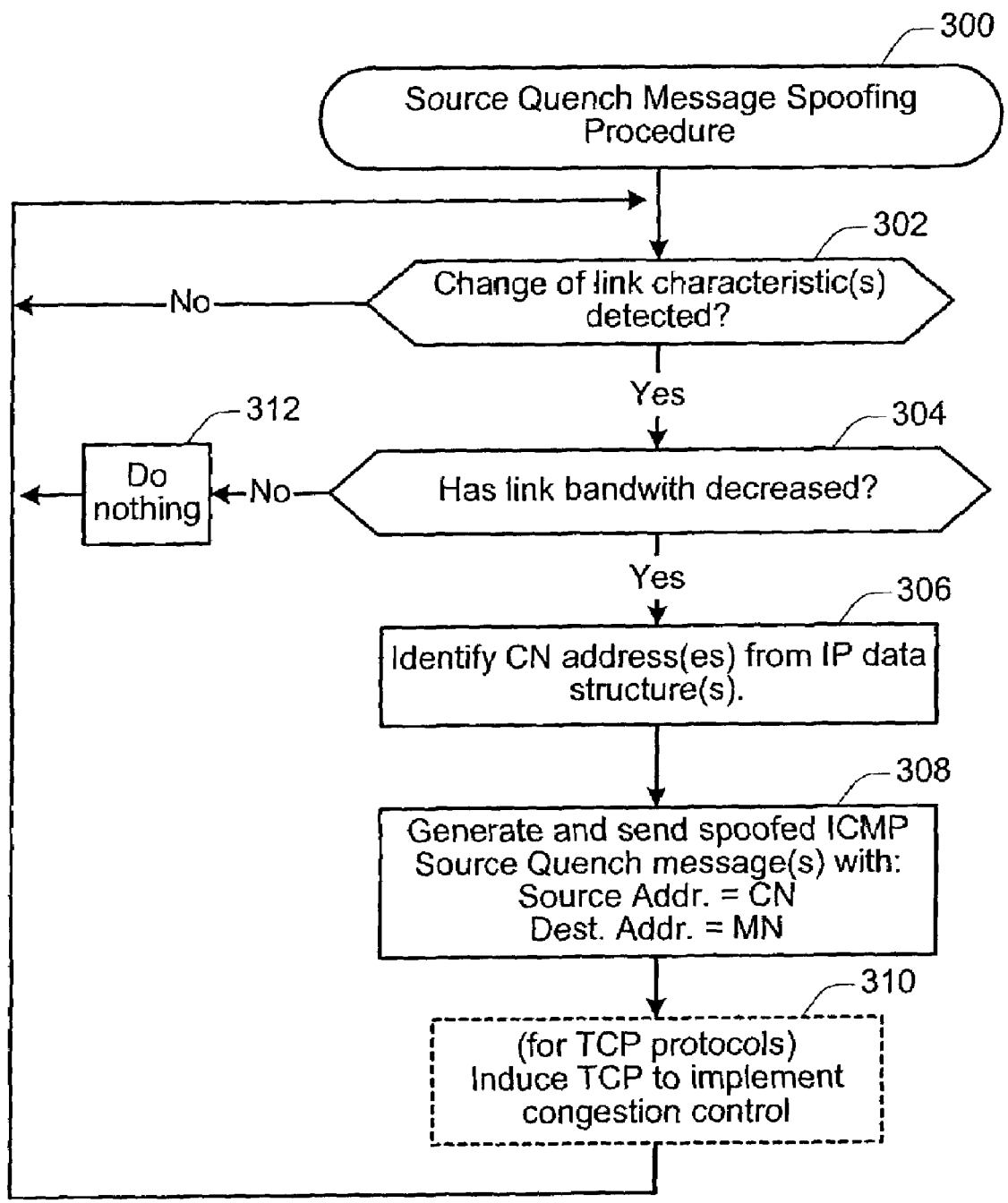
FIG. 3 shows a flow diagram of an Source Quench Message Spoofing Procedure 300 in accordance with a specific embodiment of the present invention.

FIG. 3 shows a flow diagram of a Source Quench Message Spoofing Procedure 300 in accordance with a specific embodiment of the present invention. According to at least one implementation, the ICMP Source Quench Message Spoofing Procedure 300 may be implemented at one or more mobile nodes in the Mobile IP network. As the mobile node moves through the Mobile IP network, it may connect with different foreign agents via a variety of different link types (e.g., fixed Ethernet, WLAN, CDMA, GPRS, CDPD, etc.). When the Mobile IP layer detects (302) a change in the link characteristics (e.g., a change in link type, which may occur, for example, when the mobile node roams to a new network segment and registers with a new foreign agent), a determination is made (304) as to whether the link bandwidth has decreased as a result of the change in link characteristics. If it is determined that the link bandwidth has decreased, then the addresses of the corresponding nodes (e.g., the nodes with which are currently engaged in a communication session with the mobile node) are identified (306). According to one implementation, the corresponding node addresses may be retrieved from IP data structures at the mobile node.

One or more spoofed ICMP source quench messages may then be generated (308) at the mobile node and sent locally to the mobile node. According to a specific implementation, each spoofed ICMP source quench message may be configured to appear as though the source quench message was sent from a corresponding node to the mobile node. For example, referring to FIG. 1, a spoofed ICMP source quench message may be generated at mobile node 6 in which the source address of the spoofed source quench message corresponds to the address of corresponding node 18, and the destination address of the spoofed source quench message corresponds to the address of mobile node 6. In this way, one or more applications running at the mobile node may be caused to cutback the rate of data or other information being transmitted by such applications to a level which is appropriate for the new link bandwidth.

For example, in specific implementations where the transport layer utilizes a TCP protocol (i.e., TCP layer), the receipt of a spoofed ICMP source quench message will cause the TCP layer to induce a slow start mechanism in which the size of the TCP congestion window (CWND) is reset (e.g., to a smaller value). This reduction in the size of the congestion window will result in a reduction in the data rate of outgoing traffic which is transmitted by the mobile node.

In addition to inducing a slow start mechanism at the TCP layer (e.g., at 308), it may also be desirable to induce the TCP layer to implement (310) a congestion avoidance mechanism, wherein, after the slow start mechanism has been implemented, the size of the congestion window increases linearly (with congestion avoidance being implemented), as opposed to increasing exponentially (e.g., without congestion avoidance being implemented). For example, according to a specific implementation, during congestion avoidance, the size of the congestion window may be incremented by one segment for each TCP-ACK which is received.

According to different embodiments, several different techniques may be used for inducing congestion avoidance at the TCP layer. One such technique is for the TCP layer to provide an API to Mobile IP which allows Mobile IP to invoke congestion avoidance at desired times (e.g., upon detecting a link change with lower associated bandwidth characteristics). A second technique for inducing congestion avoidance at the TCP layer is by tricking the TCP layer into thinking that there is congestion on the link. One way to do this is by saving and re-sending a last received TCP-ACK message (at the mobile node) to the TCP layer. Such a technique may be referred to as spoofing a TCP-ACK segment in order to achieve congestion avoidance.

The slow start and congestion avoidance mechanisms of the TCP protocol are described in greater detail in RFC 793,which is incorporation herein by reference in its entirety for all purposes.

According to different embodiments of the present invention, it is also possible for Mobile IP to invoke slow start and/or congestion avoidance mechanisms at the application layer 208 via an API which is provided by applications at the application layer to Mobile IP.

Another technique which may be used for implementing the adaptive feedback technique of the present invention is by the network layer triggering a call back mechanism at the transport layer (upon detection of a change in link characteristics at the mobile node) which, in turn, notifies one or more applications at the application layer of the change in link characteristics. According to at least one embodiment, the notified applications may be configured or designed to have mobile awareness capabilities such that, when the application receives notification of a change in link characteristics, the application is able to adapt to the change in link characteristics by taking appropriate action.

Figure 4A:
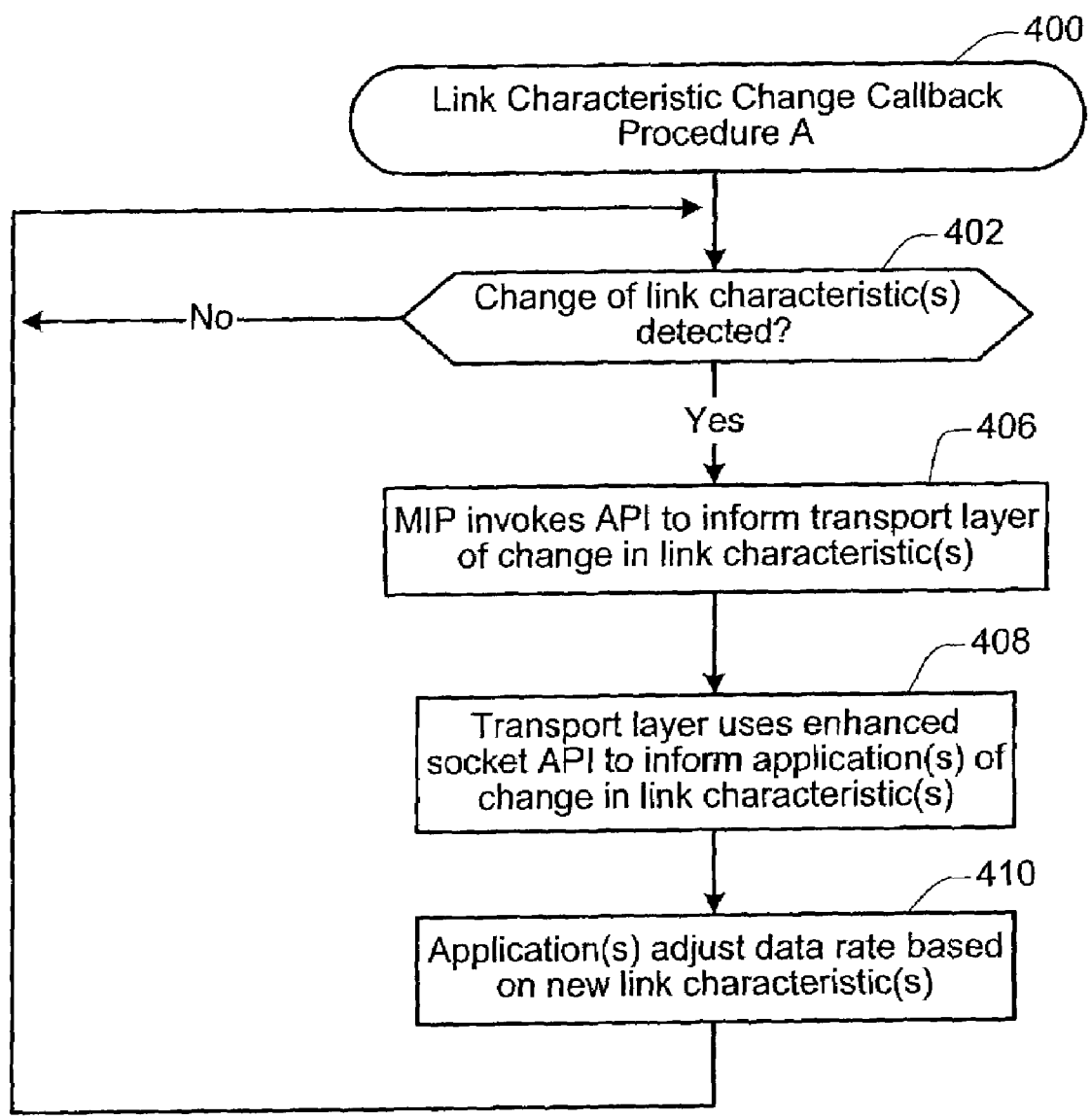
FIG. 4A shows a flow diagram of a Link Characteristic Change Call Back Procedure A 400 in accordance with a specific embodiment of the present invention.

FIG. 4A shows a flow diagram of a Link Characteristic Change Call Back Procedure 400 in accordance with a specific embodiment of the present invention. According to at least one embodiment, the Link Characteristic Change Call Back Procedure 400 may be implemented at one or more mobile nodes in a Mobile IP network. As shown in the embodiment of FIG. 4A, when a change in link characteristic(s) is detected (402) at the mobile node, the network layer (e.g., Mobile IP) may invoke (406) an API to inform the transport layer of the change in link characteristics. Conventionally, the transport layer does not provide such an API to the network layer. However, in specific embodiments of the present invention, the transport layer may be adapted to provide an API to Mobile IP which allows Mobile IP to trigger a call back into the transport layer to thereby cause the transport layer to signal applications running at the application layer to reduce their rate of data transmission in accordance with the new link characteristics. Such changes in link characteristics may include changing to a link type of higher bandwidth or changing to a link type of lower bandwidth.

After Mobile IP has invoked an appropriate API at the transport layer, the transport layer may then use (408) an enhanced socket API to inform application(s) at the application layer of the changes in the link characteristics. According to one implementation, the notification of the change in link characteristics provided from the transport layer to the application layer may be implemented using an asynchronous mechanism such as, for example, a signal which is sent to the application layer. The informed application(s) may then adjust (410) their data rate and/or take other appropriate action to adapt to new link characteristics. For example, according to one implementation, a mobile aware application may be informed of a change in link type using an enhanced socket/IOCTL interface. The application may then determine the change in link bandwidth according to the new link type, and take appropriate action to adjust its output data rate to accommodate the new link bandwidth.

Figure 4B:
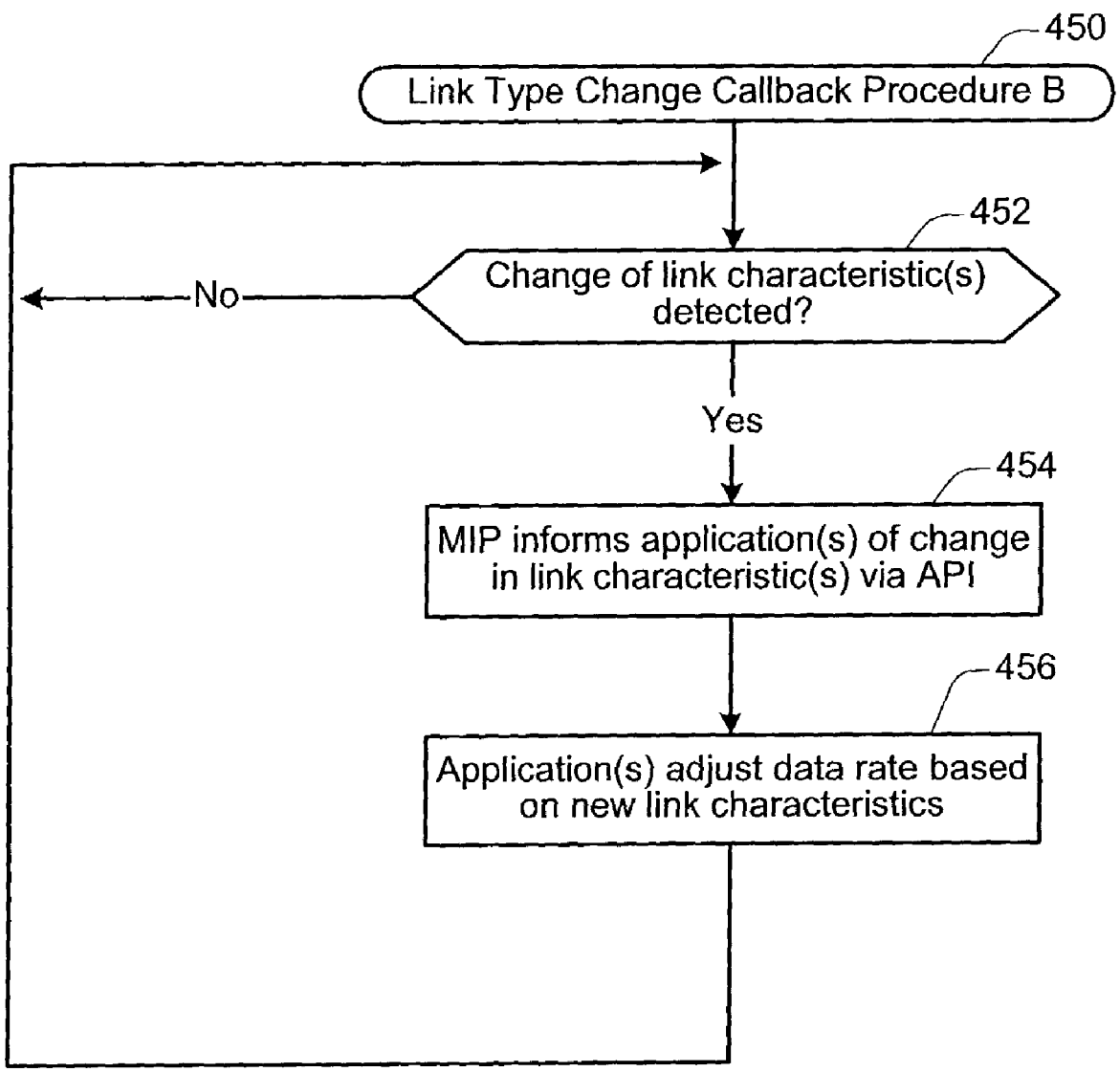
FIG. 4B shows an alternate embodiment of a Link Characteristic Change Call Back Procedure 450 in accordance with a specific embodiment of the present invention.

FIG. 4B shows an alternate embodiment of a Link Characteristic Change Call Back Procedure 450 in accordance with a specific embodiment of the present invention. In the embodiment of FIG. 4B, it is assumed that one or more of the applications at the application layer have been configured or designed to include a mobility awareness mechanism, and to provide an API to be used by the network layer (e.g., Mobile IP) upon detection of a change in link characteristics. Thus, for example, when a change in link characteristic(s) is detected (452), Mobile IP may inform 454 application(s) at the application layer of the new link characteristics via an appropriate API. The new link characteristics may include, for example, the identify of a new link type, new link bandwidth parameters, etc. The application(s) may then take appropriate action to adapt to the new link characteristics. According to a specific embodiment, such appropriate action may include modifying (456) an outgoing data rate associated with the application in accordance with the new link characteristics.

Yet another technique which may be used for implementing the adaptive feedback technique of the present invention is for the network layer to notify the RTP/RTCP layer of a change in link characteristics which, in turn, causes the RTP/RTCP layer to take appropriate action in order to accommodate the new link characteristics. As commonly known to one having ordinary skill in the art, the RTP/RTCP protocol relates to a transport protocol for real-time applications, and is described in RFC 1889, herein incorporated by reference in its entirety for all purposes.

As currently specified in RFC 1889, RTCP defines a concept known as session bandwidth, which is related to an aggregate limit of bandwidth for a particular real-time session which has been implemented at a network node (e.g., mobile node 6). Typically, the session bandwidth is calculated at initialization or at start up based upon the link characteristics at that time. Moreover, once the session bandwidth value has been calculated, the value does not change.

Figure 5A:
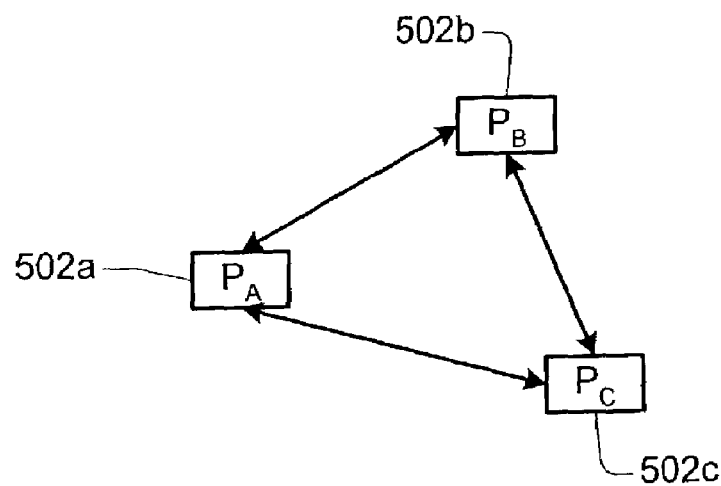
FIGS. 5A and 5B shows examples of a real-time application session which include multiple participants.
Figure 5B:
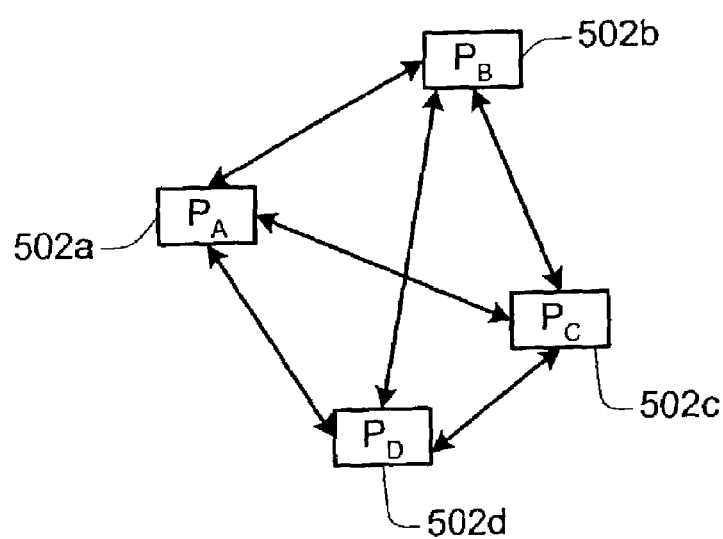

According to RFC 1889, a real-time application session (such as, for example, a video conference) may include a plurality of individual participants. This is illustrated in FIG. 5A of the drawings. FIG. 5A shows an example of a real-time application session 500a which includes 3 participants, namely participant $P_A$ 502a, participant $P_B$ 502b, and participant $P_C$ 502c. Each of the participants may be associated with a different node in the network. According to RFC 1889, if a new party (e.g., participant $P_D$ 502d, FIG. 5B) joins the session via a relatively low bandwidth link, the RTP protocol running at each of the parties in the session may respond by changing their media encoding formats to accommodate the new party on the low bandwidth link.

However, there is currently no mechanism defined in RFC 1889 for accommodating a change in link characteristics of a current participant in the real-time application session. For example, referring to FIG. 5A, if participant 502a is hosted at a mobile node (e.g., mobile node 6, FIG. 1), and the link type used by the mobile node changes to a lower bandwidth link as the result of the mobile node roaming in the IP network, there is currently no mechanism by which the Mobile IP layer can notify the RTP/RTCP layer of the change in link characteristics. Additionally, there is also no mechanism currently available for notifying the other participants in the session of participant $P_A$'S change in link characteristics.

According to at least one embodiment of the present invention, however, a feedback mechanisms may be provided between the Mobile IP layer and the RTP/RTCP layer in order to inform the RTP/RTCP layer of changes in link characteristics which are detected by the Mobile IP layer. Such information may then be used to cause RTP/RTCP to take appropriate action in order to accommodate the new link characteristics. Such appropriate may include, for example, modifying the session bandwidth to accommodate the bandwidth associated with the new link type, notifying other participants in the session of a detected change in the link characteristics of at least one participant, modifying a local message encoding format to accommodate the new link characteristics, etc.

Figure 6A:
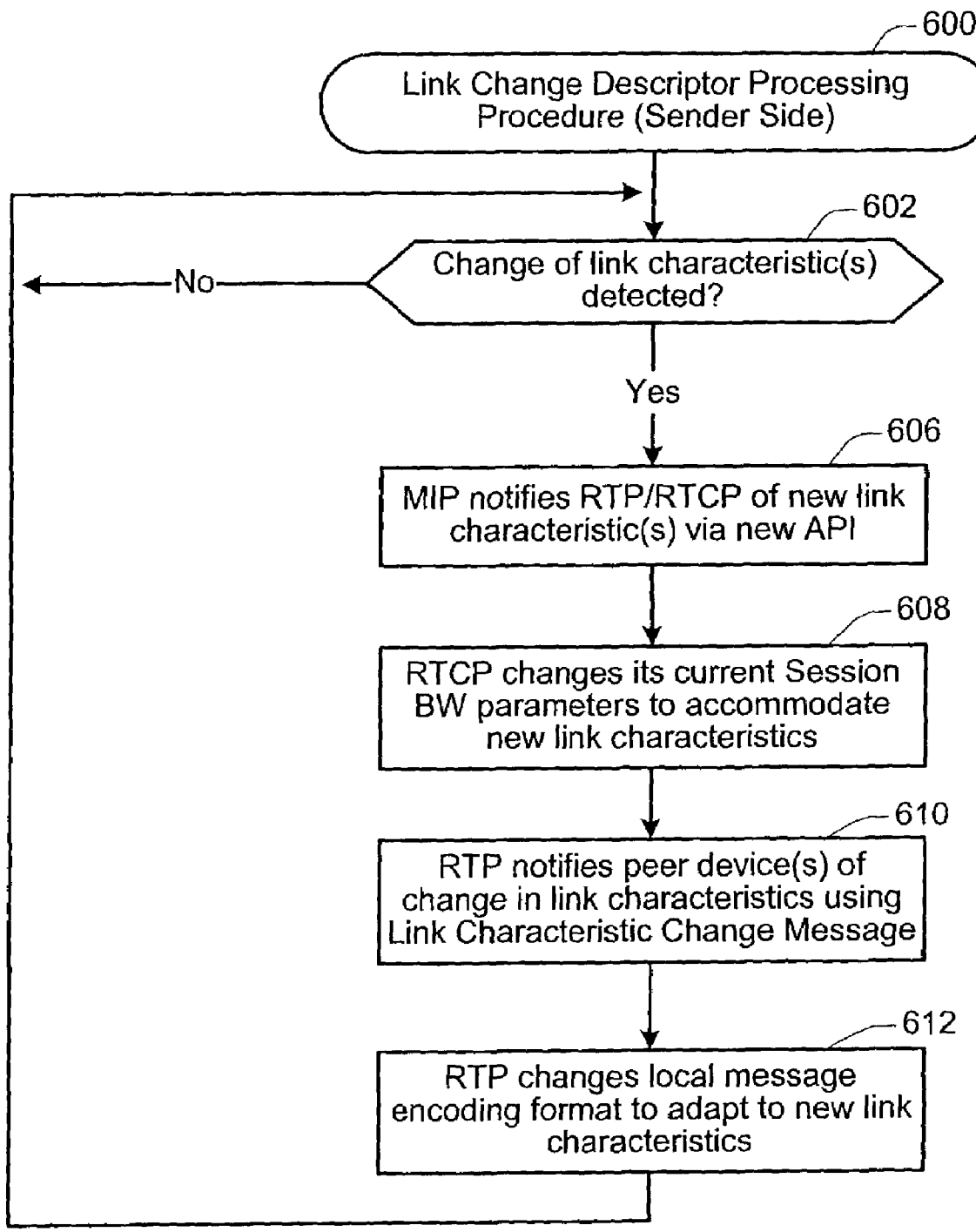
FIG. 6A shows a flow diagram of a Link Change Descriptor Processing Procedure 600 in accordance with a specific embodiment of the present invention.

FIG. 6A shows a flow diagram of a Link Change Descriptor Processing Procedure 600 in accordance with a specific embodiment of the present invention. According to one embodiment, the Link Change Descriptor Processing Procedure 600 may be implemented at one or more mobile nodes in a Mobile IP network. For purposes of illustration, it is assumed that the Link Change Descriptor Processing Procedure 600 has been implemented at mobile node 6 of FIG. 1.

As the mobile node 6 moves through the IP network, it may undergo one or more link changes as it registers with different foreign agents. When the Mobile IP layer detects (602) a change in link characteristics (such as, for example, a change in link type), the Mobile IP layer may then notify (606) the RTP/RTCP layer of the new link characteristics using, for example, a new API similar to that described with respect to operation 406 of FIG. 4A.

At 608, RTCP may modify or change its current session bandwidth parameter to accommodate the bandwidth associated with the new link characteristics. At 610, RTP may notify other peer devices (e.g., other session participants) of the detected change in link characteristics using a Link Characteristic Change Message. According to a specific embodiment, the Link Characteristic Change Message corresponds to a new source descriptor (compatible with a format defined by the RTP protocol) which may be used to inform other session participants of a change in link characteristics associated with a current session participant. For example, according to one implementation, the Link Characteristic Change Message may include new encoding information based on the new link characteristics. In an alternate embodiment, the link change descriptor may include information relating to the change in link bandwidth (e.g., either higher link bandwidth or lower link bandwidth) for a current session participant. Using the new link bandwidth information, the other participants may then adapt their encoding formats to accommodate the new link bandwidth parameters. Additionally, as shown at 612, RTP changes the local message encoding format (e.g. at mobile node 6) to accommodate the new link characteristics.

Figure 6B:
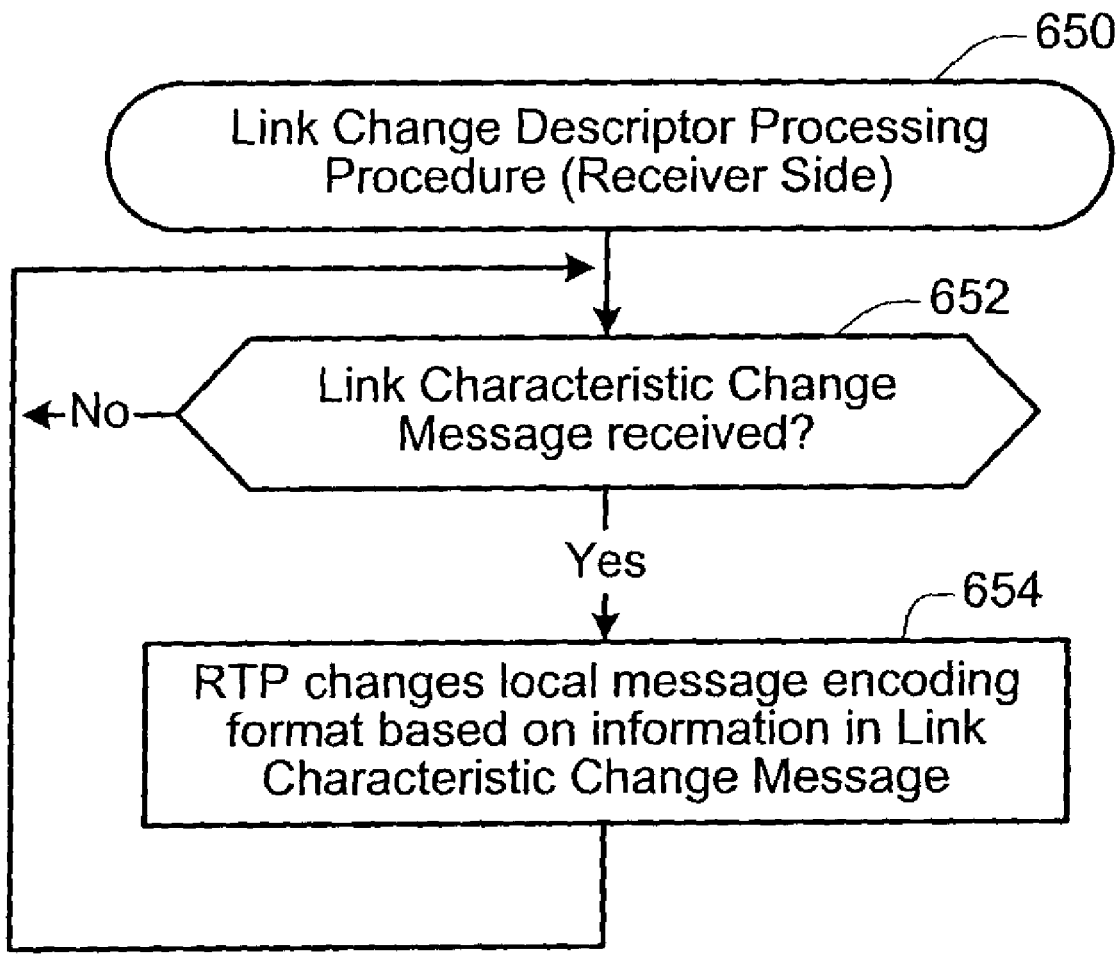
FIG. 6B shows a specific embodiment of a Link Change Descriptor Processing Procedure 650 which may be implemented at a participant node of a real-time application session.

FIG. 6B shows a specific embodiment of a Link Change Descriptor Processing Procedure 650 which may be implemented at a participant node of a real-time application session. As illustrated in FIG. 6B, when a Link Characteristic Change Message is received (652) at a participant node, the RTP layer at the participant node adapts (654) its local message encoding format to adapt to the new link characteristic information contained in the Link Characteristic Change Message. Such information may include, for example, encoding information, link bandwidth information, etc.

Using the Link Change Descriptor Processing Procedures of FIG. 6A and 6B, the participants of a real-time application session may dynamically and automatically accommodate changes in link bandwidth or other link characteristics which result from existing session participants migrating to different links within a Mobile IP network.

It will be appreciated that the adaptive feedback technique of the present invention helps applications rapidly and dynamically adapt to changes in link characteristics (e.g., link type, link bandwidth, etc.) which may occur as a result of a mobile node moving through a Mobile IP network. Moreover, the adaptive feedback technique of the present invention helps to avoid congestion on relatively low bandwidth links which, in turn, may help to minimize disruption of service of other devices using the same link. Additionally, it will be appreciated that the adaptive feedback technique of the present invention may be used to allow applications to adapt to changes in link characteristics well before conventional transport layer feedback mechanisms kick in.

It will be appreciated that different embodiments of the present invention may incorporate a variety of different aspects of the present invention, such as, for example, one or more of the aspects described above. Although some embodiments of the present invention may incorporate all of the above-described aspects, it is also contemplated that different embodiments of the present invention may incorporate only a portion of the above-described aspects of the present invention. Additionally, it will be appreciated that different embodiments of the present invention may include other aspects, features and/or advantages commonly known to one having ordinary skill in the art which have not been explicitly described in this application.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500,and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
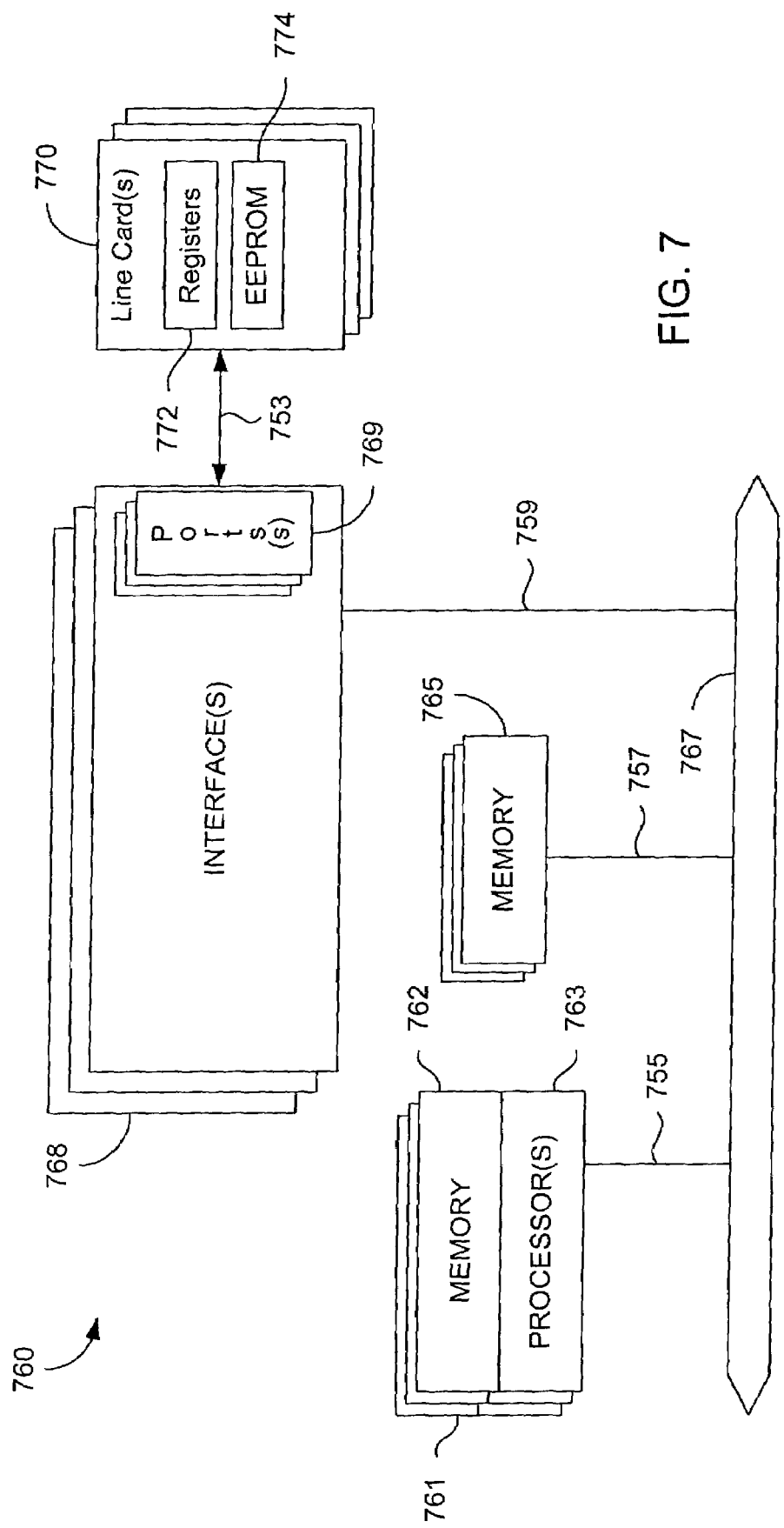
FIG. 7 is a diagram illustrating an exemplary network device in which embodiments of the invention may be implemented.

Referring now to FIG. 7, a network device 760 suitable for implementing the techniques of the present invention includes a master central processing unit (CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as an intermediate router, the CPU 762 may be responsible for analyzing packets, encapsulating packets, and forwarding packets for transmission to a set-top box. The CPU 762 preferably accomplishes all these functions under the control of software including an operating system (e.g. Windows NT), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets over the network and sometimes support other peripherals used with the network device 760. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable a mobile node to be dynamically assigned a Home Agent, as well as enable a shared key to be provided to the mobile node and/or the appropriate Mobility Agents (e.g., Home Agents). However, it should be understood that the invention is not limited to such implementations, but instead would equally apply regardless of the context and system in which it is implemented. Thus, broadly speaking, the operations described above may be used to enable dynamic assignment with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

The invention claimed is:

1. A method for providing adaptive feedback in a mobile data network, the mobile data network including a plurality of mobile nodes, a mobile node having an application layer, a transport layer, and a network layer including a mobile IP sub-layer, which communicates with a data network via a plurality of network segments, each network segment including a communication link having associated link characteristics, the method comprising:
   detecting, at the mobile IP sub-layer of a first mobile node, a change in at least one link characteristic associated with a communication link used by the first mobile node to communicate with the data network;
   transmitting a request from the mobile-IP sub-layer to the transport layer requesting a transport layer API;
   providing the transport-layer API to the mobile IP sub-layer;
   executing the API in the mobile-IP sub-layer so that the sub-layer can make a call back to the transport layer wherein the call back contains instructions to the transport layer to notify at least one entity executing in the application layer of the change in the at least one link characteristic; and
   transmitting a signal from the transport layer to the at least one entity to adapt to the change in the at least one link characteristic, thereby communicating information relating to the change from the mobile IP sub-layer to the at least one entity executing in the application layer.

2. The method of claim 1 wherein said detecting of the change in at least one link characteristic includes detecting a change in a link type associated with the communication link used by the first mobile node.

3. The method of claim 1 wherein said change in link characteristics is detected at the network layer of the first mobile node.

4. The method of claim 1 wherein said notifying is performed by the Mobile UP sub-layer; and
   wherein said notifying includes notifying an RTP/RTCP layer at the first mobile node of information relating to the change in the at least one link characteristic to thereby enable the RTP/RTCP layer to dynamically adapt to the change in the at least one link characteristic.

5. The method of claim 4 further comprising:
   notifying, using a first API, the RTP/RTCP layer of information relating to the change in the at least one link characteristic; and
   dynamically modifying a session bandwidth parameter associated with an RTCP portion of the RTP/RTCP layer to accommodate a bandwidth associated with the at least one link characteristic.

6. The method of claim 4 further comprising:
   notifying, using a first API, the RTP/RTCP layer of information relating to the change in the at least one link characteristic; and
   dynamically modifying an RTP message encoding format to accommodate the change in the at least one link characteristic.

7. The method of claim 4 wherein the first mobile node is a participant in a real-time application session;
   wherein the method further comprises:
   notifying, using a first API, the RTP/RTCP layer of information relating to the change in the at least one link characteristic; and
   notifying, via a source descriptor message, at least one other participant in the real-time application session of the change in the at least one link characteristic to thereby allow the at least one other participant to take appropriate action to accommodate the change relating to the at least one link characteristic.

8. The method of claim 7 wherein said source descriptor message is compatible with an RTP protocol.

9. The method of claim 1 further comprising:
   notifying, using a first API, the transport layer at the first mobile node of information relating to the change in the at least one link characteristic.

10. The method of claim 9 further comprising informing, in response to the first API being invoked, at least one application at the first mobile node of information relating to the change in the at least one link characteristic.

11. The method of claim 10 wherein the informing of the at least one application is accomplished using an enhanced socket API.

12. The method of claim 10 further comprising modifying an outgoing data rate associated with the at least one application to accommodate a bandwidth associated with the at least one link characteristic;
   wherein modification of the outgoing data rate is performed in response to information being received relating to a change in the at least one link characteristic.

13. The method of claim 1 further comprising:
   notifying, using a second API, at least one application at the first mobile node of information relating to the change in the at least one link characteristic;
   wherein the notifying of the at least one application is performed by the Mobile IP sub-layer.

14. The method of claim 13 further comprising modifying an outgoing data rate associated with the at least one application to accommodate a bandwidth associated with the at least one link characteristic;
   wherein modification of the outgoing data rate is performed in response to information being received, via the second API, relating to a change in the at least one link characteristic.

15. The method of claim 1 further comprising generating, at the first mobile node, a first spoofed source quench message;
the first spoofed source quench message having a source address that corresponds to a network address of a first corresponding node in the mobile data network which is engaged in a communication session with the first mobile node;
and wherein a destination address of the first spoofed source quench message corresponds to a network address of the first mobile node.

16. The method of claim 15 further comprising:
sending the first spoofed source quench message to the first mobile node; and
inducing a TCP slow start mechanism at the transport layer of the first mobile node in response to the first mobile node receiving the first spoofed source quench message.

17. The method of claim 15 further comprising inducing a transport layer at the first mobile node to implement a TCP congestion avoidance mechanism.

18. The method of claim 17 wherein said inducing comprises:
saving a TCP-ACK message which was last received at the first mobile node; and
re-sending the saved TCP-ACK message at the first mobile node.

19. The method of claim 17 wherein said inducing comprises invoking said congestion avoidance mechanism using an API provided by an entity at the transport layer of the first mobile node.

20. The method of claim 15 wherein the first spoofed source quench message is generated in response to a determination that the change in the at least one link characteristic includes a reduction in link bandwidth of the communication link used by the first mobile node to communicate with the data network.

21. A computer program product for providing adaptive feedback in a mobile data network, the mobile data network including plurality of mobile nodes, a mobile node having an application layer, a transport layer, and a network layer including a mobile IP sub-layer which communicates with a data network via a plurality of network segments, each network segment including a communication link having associated link characteristics, the computer program product comprising:
a computer usable medium having computer readable code embodied therein, the computer readable code comprising:
computer code for detecting, at the mobile IP sub-layer of a first mobile node, a change in at least one link characteristic associated with a communication link used by the first mobile node to communicate with the data network;
wherein the call back contains instructions to the transport layer to notify at least one entity executing in the application layer;
computer code for transmitting a request from the mobile-IP sub-layer to the transport layer requesting a transport layer API;
computer code for providing the transport-layer API to the mobile IP sub-layer;
computer code for executing the API in the mobile-IP sub-layer so that the sub-layer can make a call back to the transport layer;
wherein the call back contains instructions to the transport layer to notify at least one entity executing in the application layer of the change in the at least one link characteristic; and
computer code for transmitting a signal from the transport layer to the at least one entity to adapt to the change in the at least one link characteristic, thereby communicating information relating to the change from the mobile IP sub-layer to the at least one entity executing in the application layer.

22. The computer program product of claim 21 wherein said computer code for detecting of the change in at least one link characteristic includes computer code for detecting a change in a link type associated with the communication link used by the first mobile node.

23. The computer program product of claim 21 wherein said change in link characteristics is detected at the network layer of the first mobile node.

24. The computer program product of claim 21 wherein said change in link characteristics is detected at the Mobile IP sub-layer of the first mobile node.

25. The computer program product of claim 21 wherein said computer code for notifying is implemented at a Mobile IP layer; and
wherein said computer code for notifying includes computer code for notifying an RTP/RTCP layer at the first mobile node of information relating to the change in the at least one link characteristic to thereby enable the RTP/RTCP layer to dynamically adapt to the change in the at least one link characteristic.

26. The computer program product of claim 25 further comprising:
computer code for notifying, using a first API, the RTP/RTCP layer of information relating to the change in the at least one link characteristic; and
computer code for dynamically modifying a session bandwidth parameter associated with an RTCP portion of the RTP/RTCP layer to accommodate a bandwidth associated with the at least one link characteristic.

27. The computer program product of claim 25 further comprising:
computer code for notifying, using a first API, the RTP/RTCP layer of information relating to the change in the at least one link characteristic; and
computer code for dynamically modifying an RTP message encoding format to accommodate the change in the at least one link characteristic.

28. The computer program product of claim 25 wherein the first mobile node is a participant in a real-time application session;
wherein the computer program product further comprises:
computer code for notifying, using a first API, the RTP/RTCP layer of information relating to the change in the at least one link characteristic; and
computer code for notifying, via a source descriptor message, at least one other participant in the real-time application session of the change in the at least one link characteristic to thereby allow the at least one other participant to take appropriate action to accommodate the change relating to the at least one link characteristic.

29. The computer program product of claim 28 wherein said source descriptor message is compatible with an RTP protocol.

30. The computer program product of claim 21 further comprising:

computer code for notifying, using a first API, the transport layer at the first mobile node of information relating to the change in the at least one link characteristic.

31. The computer program product of claim 30 further comprising computer code for informing, in response to the first API being invoked, at least one application at the first mobile node of information relating to the change in the at least one link characteristic.

32. The computer program product of claim 31 wherein the informing of the at least one application is accomplished using an enhanced socket API.

33. The computer program product of claim 31 further comprising computer code for modifying an outgoing data rate associated with the at least one application to accommodate a bandwidth associated with the at least one link characteristic;

wherein modification of the outgoing data rate is performed in response to information being received relating to a change in the at least one link characteristic.

34. The computer program product of claim 21 further comprising:

computer code for notifying, using a second API, at least one application at the first mobile node of information relating to the change in the at least one link characteristic;

wherein the notifying of the at least one application is performed by a Mobile IP layer.

35. The computer program product of claim 34 further comprising computer code for modifying an outgoing data rate associated with the at least one application to accommodate a bandwidth associated with the at least one link characteristic;

wherein modification of the outgoing data rate is performed in response to information being received, via the second API, relating to a change in the at least one link characteristic.

36. The computer program product of claim 21 further comprising computer code for generating, at the first mobile node, a first spoofed source quench message compatible with an ICMP protocol;

the first spoofed source quench message having a source address that corresponds to a network address of a first corresponding node in the mobile data network which is engaged in a communication session with the first mobile node;

and wherein a destination address of the first spoofed source quench message corresponds to a network address of the first mobile node.

37. The computer program product of claim 36 further comprising:

computer code for sending the first spoofed source quench message at the first mobile node; and computer code for inducing a TCP slow start mechanism at the transport layer of the first mobile node in response to the first mobile node receiving the first spoofed source quench message.

38. The computer program product of claim 36 further comprising computer code for inducing a transport layer at the first mobile node to implement a TCP congestion avoidance mechanism.

39. The computer program product of claim 38 wherein said computer code for inducing comprises:

computer code for saving a TCP-ACK message which was last received at the first mobile node; and computer code for re-sending the saved TCP-ACK message at the first mobile node.

40. The computer program product of claim 38 wherein said computer code for inducing comprises computer code for invoking said congestion avoidance mechanism using an API provided by an entity at the transport layer of the first mobile node.

41. The computer program product of claim 36 wherein the first spoofed source quench message is generated in response to a determination that the change in the at least one link characteristic includes a reduction in link bandwidth of the communication link used by the first mobile node to communicate with the data network.

42. A system for providing adaptive feedback in a mobile data network, the mobile data network including a plurality of mobile nodes, a mobile node having an application layer, a transport layer, and a network layer including a mobile IP sub-layer which communicate with a data network via a plurality of network segments, each network segment including a communication link having associated link characteristics, the system comprising:

means for detecting, at the mobile IP sub-layer of a first mobile node, a change in at least one link characteristic associated with a communication link used by the first mobile node to communicate with the data network;

means for transmitting a request from the mobile-IP sub-layer to the transport layer requesting a transport layer API;

means for providing the transport-layer API to the mobile IP sub-layer;

means for executing the API in the mobile-IP sub-layer so that the sub-layer can make a call back to the transport layer, wherein the call back contains instructions to the transport layer to notify at least one entity executing in the application layer of the change in the at least one link characteristic; and means for transmitting a signal from the transport layer to the at least one entity to adapt to the change in the at least one link characteristic, thereby communicating information relating to the change from the mobile IP sub-layer to the at least one entity executing in the application layer.

43. The system of claim 42 wherein said means for detecting of the change in at least one link characteristic includes means for detecting a change in a link type associated with the communication link used by the first mobile node.

44. The system of claim 42 wherein said change in link characteristics is detected at the Mobile IP sub-layer of the first mobile node.

45. The system of claim 42 wherein said means for notifying is implemented at the Mobile IP sub-layer; and wherein said means for notifying includes means for notifying an RTP/RTCP layer at the first mobile node of information relating to the change in the at least one link characteristic to thereby enable the RTP/RTCP layer to dynamically adapt to the change in the at least one link characteristic.

46. The system of claim 45 wherein the first mobile node is a participant in a real-time application session;

wherein the system further comprises:

means for notifying, using a first API, the RTP/RTCP layer of information relating to the change in the at least one link characteristic; and means for notifying, via a source descriptor message, at least one other participant in the real-time application session of the change in the at least one link characteristic to thereby allow the at least one other participant to take appropriate action to accommodate the change relating to the at least one link characteristic.

47. The system of claim 45 further comprising:
means for notifying, using a first API, a transport layer at the first mobile node of information relating to the change in the at least one link characteristic.

48. The system of claim 47 further comprising means for informing, in response to the first API being invoked, at least one application at the first mobile node of information relating to the change in the at least one link characteristic.

49. The system of claim 48 further comprising means for modifying an outgoing data rate associated with the at least one application to accommodate a bandwidth associated with the at least one link characteristic;
wherein modification of the outgoing data rate is performed in response to information being received relating to a change in the at least one link characteristic.

50. The system of claim 42 further comprising means for generating, at the first mobile node, a first spoofed source quench message compatible with an ICMP protocol;
the first spoofed source quench message having a source address that corresponds to a network address of a first corresponding node in the mobile data network which is engaged in a communication session with the first mobile node; and
wherein a destination address of the first spoofed source quench message corresponds to a network address of the first mobile node.

51. The system of claim 50 further comprising means for inducing the transport layer at the first mobile node to implement a TCP congestion avoidance mechanism.

52. A mobile node adapted to provide feedback in a mobile data network, the mobile data network including a plurality of mobile nodes, a mobile node having an application layer, a transport layer, and a network layer including a mobile IP sub-layer, which communicate with a data network via a plurality of network segments, each network segment including a communication link having associated link characteristics, the mobile node comprising:
at least one processor;
at least one interface configured or designed to provide a communication link to the data network; and
memory;
the mobile node being configured or designed to detect, at the mobile sub-layer of the mobile node, a change in at least one link characteristic associated with the communication link used by the mobile node to communicate with the data network; and
the mobile node being further configured or designed to communicate information relating to the change from the mobile IP sub-layer to at least one entity executing in the application layer, wherein the communication is performed by the mobile IP sub-layer, transmitting a request from the mobile-IP sub-layer to the transport layer requesting a transport layer API, the API provided by the transport layer to the mobile-IP sub-layer and executing the API in the mobile-IP sub-layer so that the sub-layer can make a call back to the transport layer, wherein the call back contains instructions to the transport layer to notify at least one entity executing in the application layer of the chance in the at least one link characteristic.

53. The mobile node of claim 52 wherein the mobile node is further configured or designed to detect a change in a link type associated with the communication link used by the mobile node.

54. The mobile node of claim 52 wherein said change in link characteristics is detected at the network layer of the mobile node.

55. The mobile node of claim 52 wherein said notifying is performed by a Mobile IP layer; and
wherein the mobile node is further configured or designed to notify an RTP/RTCP layer at the mobile node of information relating to the change in the at least one link characteristic to thereby enable the RTP/RTCP layer to dynamically adapt to the change in the at least one link characteristic.

56. The mobile node of claim 55 being further configured or designed to:
notify, using a first API, the RTP/RTCP layer of information relating to the change in the at least one link characteristic; and
dynamically modify a session bandwidth parameter associated with an RTCP portion of the RTP/RTCP layer to accommodate a bandwidth associated with the at least one link characteristic.

57. The mobile node of claim 55 being further configured or designed to:
notify, using a first API, the RTP/RTCP layer of information relating to the change in the at least one link characteristic; and
dynamically modify an RTP message encoding format to accommodate the change in the at least one link characteristic.

58. The mobile node of claim 55 wherein the mobile node is a participant in a real-time application session;
wherein the mobile node is further configured or designed to notify, using a first API, the RTP/RTCP layer of information relating to the change in the at least one link characteristic; and
wherein the mobile node is further configured or designed to notify, via a source descriptor message, at least one other participant in the real-time application session of the change in the at least one link characteristic to thereby allow the at least one other participant to take appropriate action to accommodate the change relating to the at least one link characteristic.

59. The mobile node of claim 58 wherein said source descriptor message is compatible with an RTP protocol.

60. The mobile node of claim 52 being further configured or designed to notify, using a first API, a transport layer at the mobile node of information relating to the change in the at least one link characteristic.

61. The mobile node of claim 60 being further configured or designed to inform, in response to the first API being invoked, at least one application at the mobile node of information relating to the change in the at least one link characteristic.

62. The mobile node of claim 61 wherein the informing of the at least one application is accomplished using an enhanced socket API.

63. The mobile node of claim 61 being further configured or designed to modify an outgoing data rate associated with the at least one application to accommodate a bandwidth associated with the at least one link characteristic;
wherein modification of the outgoing data rate is performed in response to information being received relating to a change in the at least one link characteristic.

64. The mobile node of claim 52 being further configured or designed to notify, using a second API, at least one application at the mobile node of information relating to the change in the at least one link characteristic;
wherein the notifying of the at least one application is performed by a Mobile IP layer.

65. The mobile node of claim 64 being further configured or designed to modify an outgoing data rate associated with the at least one application to accommodate a bandwidth associated with the at least one link characteristic;
wherein modification of the outgoing data rate is performed in response to information being received, via the second API, relating to a change in the at least one link characteristic.

66. The mobile node of claim 52 being further configured or designed to generate, at the mobile node, a first spoofed source quench message compatible with an ICMP protocol;
the first spoofed source quench message having a source address that corresponds to a network address of a first corresponding node in the mobile data network which is engaged in a communication session with the mobile node;
and wherein a destination address of the first spoofed source quench message corresponds to a network address of the mobile node.

67. The mobile node of claim 66 being further configured or designed to send the first spoofed source quench message at the mobile node; and
wherein the mobile node is further configured or designed to induce a TCP slow start mechanism at the transport layer of the mobile node in response to the mobile node receiving the first spoofed source quench message.

68. The mobile node of claim 66 being further configured or designed to induce the transport layer at the mobile node to implement a TCP congestion avoidance mechanism.

69. The mobile node of claim 68 being further configured or designed to save a TCP-ACK message which was last received at the mobile node; and
wherein the mobile node is further configured or designed to re-send the saved TCP-ACK message at the mobile node.

70. The mobile node of claim 68 being further configured or designed to invoke said congestion avoidance mechanism using an API provided by an entity at the transport layer of the mobile node.

71. The mobile node of claim 66 being further configured or designed to generate the first spoofed source quench message in response to a determination that the change in the at least one link characteristic includes a reduction in link bandwidth of the communication link used by the mobile node to communicate with the data network.

* * * * *